Figure 1A:
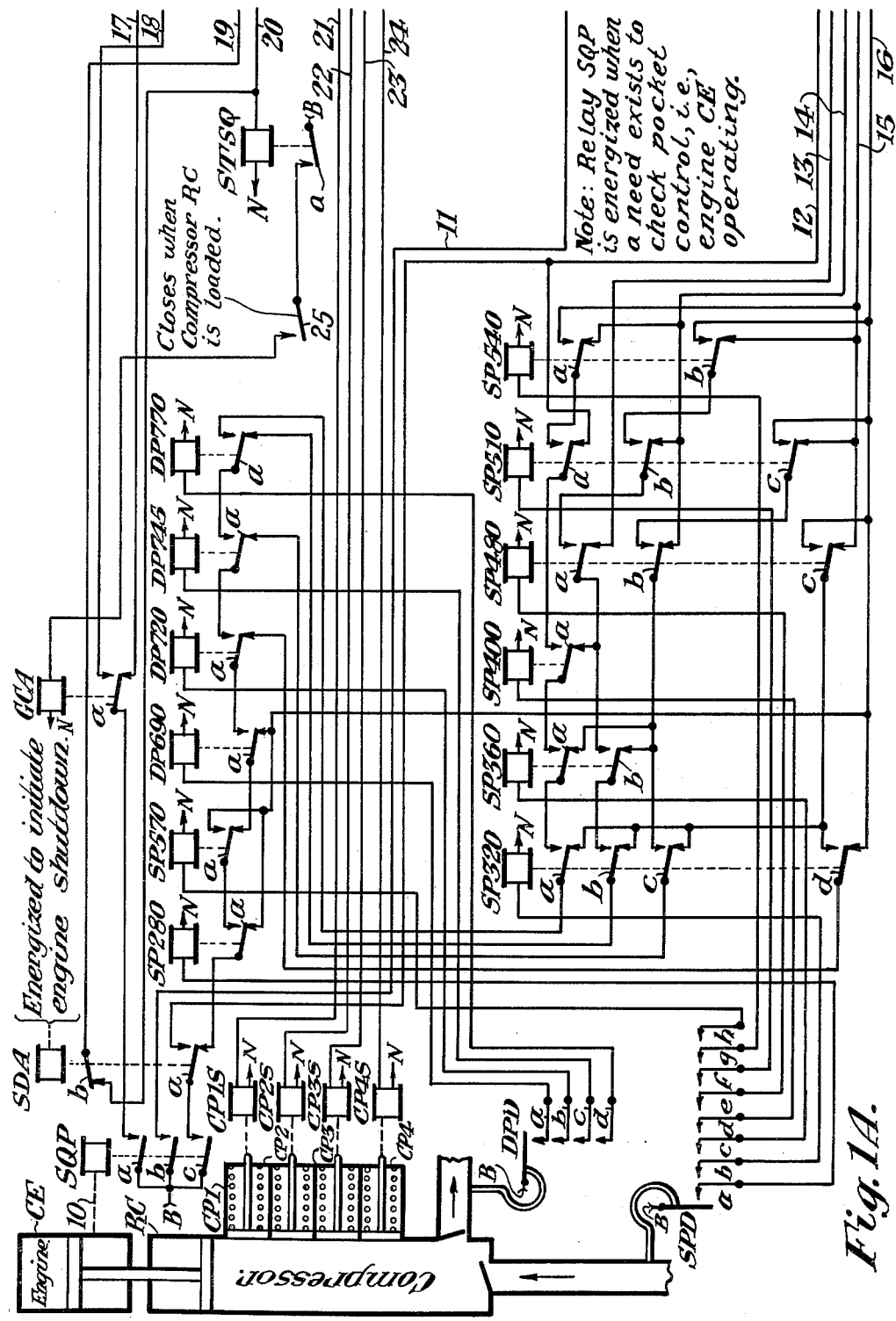

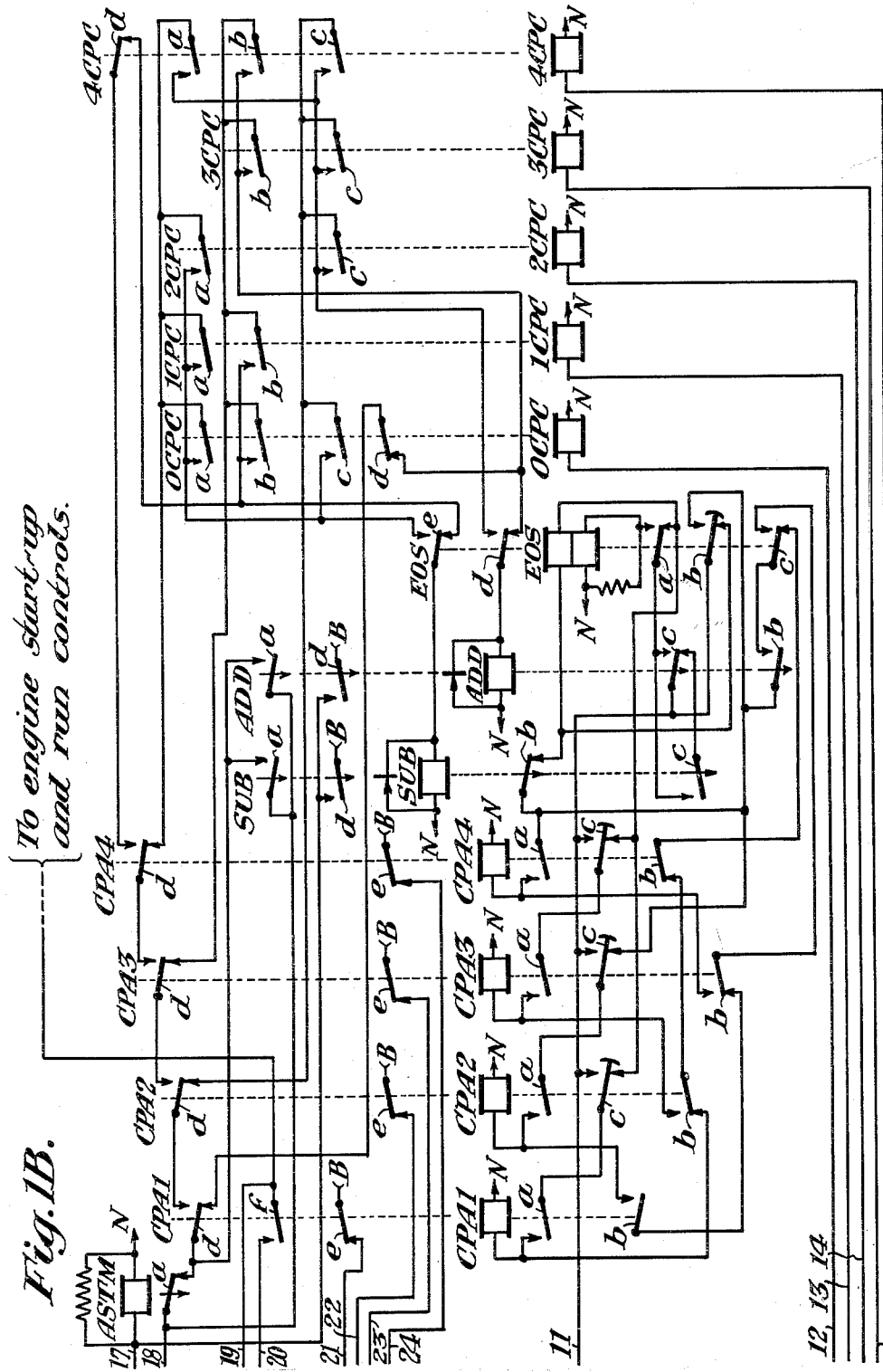

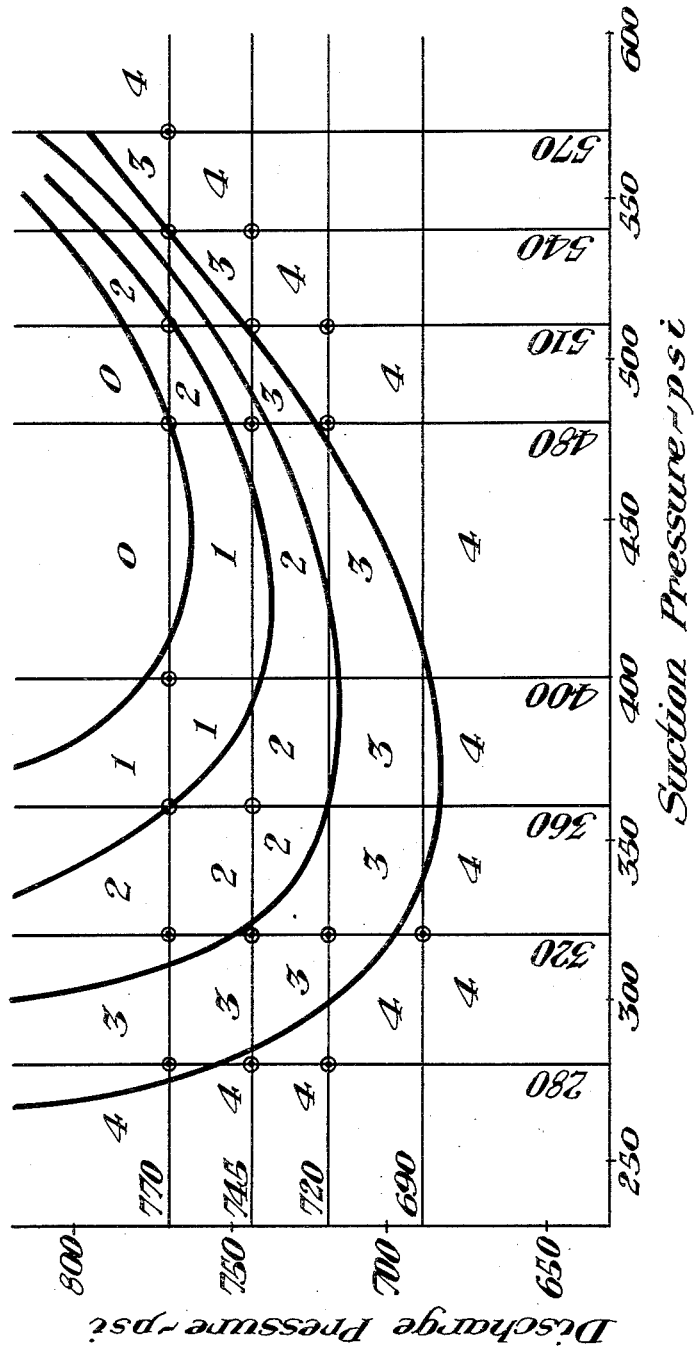

March 13, 1962

United States Patent Office 3,024,964
Patented Mar. 13, 1962

3,024,964
AUTOMATIC TORQUE CONTROL FOR RECIPROCATING COMPRESSORS
David G. Emmel, Castle Shannon, Pa., assignor to Westinghouse Air Brake Company, Wilmerding, Pa., a corporation of Pennsylvania
Filed May 13, 1960, Ser. No. 28,869
9 Claims. (Cl. 230—21)

My invention relates to automatic torque control for reciprocating compressors. More particularly, my invention concerns an arrangement for automatically controlling the opening and closing of compressor clearance pockets to maintain the proper torque on the engine-compressor unit.

When reciprocating gas compressors are driven by a directly coupled engine, a principal problem is over-torque conditions on the engine which occur during certain operating or pressure conditions in the compressor. In general, these over-torque areas have been avoided in the past by manual adjustment of clearance pockets in the compressor to vary the compression stroke of the compressor cylinder. The opening of such clearance pockets increases the volume of the cylinder so that the particular suction and discharge pressure combination at which the compressor is operating will not be in the over-torque area of the engine. In other words, the opening of a closed pocket reduces the actual torque requirement on the engine at the existing pressure load level. However, at the same time, it is a basic requirement of this type of compressor operation that the system be operated as near maximum permissible torque as possible in order to maintain the highest possible efficiency of operation.

In the operation of gas pipe lines, the use of such compressors, driven generally by directly coupled engines powered by the transported gas, are necessary at intervals along the pipe line to increase the pressure of the gas being transported in order to maintain a steady flow at a sufficient volume for efficient operation. Obviously, when such pipe lines are provided with remote control apparatus for operating the stations along the line which include such compressors, manual control of the torque conditions on the engine-compressor unit is not possible. It is also not feasible, even with the remote control system, to remotely indicate the torque conditions at the central office location and transmit in return controls which will open or close the necessary clearance pockets. The only practicable type of operation is local automatic control of the opening and closing of such clearance pockets in order to provide an efficient arrangement. Such automatic operations guard against over-torque conditions on the engine existing for any appreciable period and makes it possible to achieve maximum efficiency of operation at such remote compressor locations.

Accordingly, an object of my invention is a system for automatically controlling the clearance pockets on reciprocating compressors to achieve maximum operating efficiency without causing over-torque conditions on the engine driving the compressor.

Another object of my invention is the provision of an arrangement for automatically opening and closing the clearance pockets of a reciprocating compressor, as the operating pressure conditions vary, in order to avoid over-torque conditions on the driving engine.

Also an object of my invention is apparatus for automatically sensing input and output conditions of a reciprocating compressor in order to establish the maximum efficiency torque requirement.

Still another object of my invention is a circuit arrangement using pressure switches to sense an approximation of the operating curves of a reciprocating compressor to establish requirements for opening and closing clearance pockets of the compressor to assure the maximum possible operating efficiency.

A further object of my invention is a system for automatically controlling the clearance pockets of a reciprocating compressor using pressure switches, which measure the suction and discharge pressures of that compressor, to approximate the operating curves to establish the number of clearance pockets which must be closed to maintain the engine torque within operating limits.

Other objects, features, and advantages of my invention will become apparent from the following specification when taken in connection with the accompanying drawings.

Referring to the drawings, FIGS. 1A and 1B, when taken together with FIG. 1A on the left, show in partly schematic form a circuit arrangement embodying one form of my invention for controlling the clearance pockets on a reciprocating compressor driven by a directly connected gas engine.

FIG. 2 of the drawings illustrates a series of typical torque limiting curves, plotted in terms of discharge and suction pressures of the reciprocating compressor, for the engine driving that compressor.

In practicing my invention, I provide an all-relay circuit arrangement for automatically sensing the clearance pocket requirement, that is, the number of pockets closed or open, for a reciprocating compressor and for controlling the operation of these pockets into the required positions without any manual intervention. Pressure detecting switches are used to measure the suction and discharge pressures of the compressor unit. Each set of pressure detecting switches controls a series of relays which sequentially register the increasing pressures at selected points in the pressure range. A joint matrix of contacts of these pressure relays forms a computing network which determines the number of clearance pockets of the compressor which should be closed at various points in the operating pressure curves. The number of pockets to be closed is indicated by the energized condition of a relay which is assigned to that number of pockets, there being a relay for each possible number of pockets closed in the compressor including zero or no pockets closed. This pressure relay contact matrix and the energized pocket requirement relay approximately spot the position, on the engine torque limiting curves, of the existing pressure conditions in the compressor and initiate action to have the number of pockets actually closed agree with the requirement. The operation of each clearance pocket is actuated by a relay assigned to control that particular pocket, there being one such relay for each pocket in the compressor so that the number of actuating relays equals the number of clearance pockets. In actual practice, the control of the clearance pocket operation may be directly by solenoid or through some pneumatic arrangement of valve operation. For simplicity, it is here considered, and is so illustrated, that the pockets are directly controlled by a series of solenoids, one for each pocket. These solenoids in turn are controlled by the pocket actuating relays.

The pocket actuating relays are connected in a reversible counting chain network in which the number of pockets to be closed is equal to the total count existing in the reversible chain. This reversible counting chain is driven by a pair of relays which detect the requirements to add or subtract a closed pocket from the existing condition. Further control is exercised on the counting chain by a supplemental selection relay which shifts between the odd and even total count to provide proper control. The detection relays which respectively control the addition and subtraction of counts from the chain are controlled by a circuit network including contacts of the compressor pocket closed relays connected in several contact matrixes. A shift is made from matrix to matrix in the network by contacts of the pocket actuating relays as they are energized and deenergized during counting operations and by the supplemental selection relay as it selects between the even and odd count existing in the chain. In effect, this reversible counting chain is driven to add or subtract counts from the total as the pressures of the compressor change to vary the pocket requirement. Each counting chain or pocket actuating relay when energized causes the release of the solenoid which controls the corresponding pocket, allowing it to become closed. Obviously, other control arrangements are possible in accordance with the actual structure of the compressor and its clearance pockets. The network controlling the detection relays which add or subtract the counts from the chain is so arranged that only one count can be entered or deleted during a selected time cycle. This operation allows the reciprocating compressor system to stabilize after an individual clearance pocket is opened or closed prior to the operation of additional pockets which may then prove to be unnecessary. This timing arrangement permits the control of only one pocket during each cycle regardless of the requirement for a change in two or more clearance pockets at one time. Such operation particularly occurs during the start-up or shut-down sequence of the engine-compressor arrangement.

Referring now specifically to FIG. 2 of the drawings, there is shown a series of typical torque limiting curves for a compressor engine. These curves are plotted in terms of the discharge pressure versus the suction pressure of the driven reciprocating compressor. Each curve represents the torque limits at a different brake horsepower output of the compressor engine. It is to be understood that these represent a typical set of such curves and that any similar set of curves may be the basis for a system embodying the arrangement of my invention. For purposes of the present description, these torque limiting curves are considered to be those applicable to the compressor engine CE shown in FIG. 1A which drives the compressor RC, also illustrated in schematic manner in the same drawing. In the graph of FIG. 2, the series of four horizontal lines represent the selected discharge pressures involved in the control system of my invention while similar vertical lines represent the selected suction pressures which are also used for control. The specially marked intersections of these selected discharge and suction pressure lines represent the actual control points used in the specific example illustrated and described in this application.

The selected discharge and suction pressures are measured, as will be indicated shortly, and the cross readings establish these specially selected control points. In each case, each control point represents the low pressure corner of one of the several rectangular sub-areas established by the intersecting selected pressure lines. In each of the sub-areas, the numeral superimposed thereon indicates the required number of clearance pockets in the specific compressor illustrated which must be closed to meet as closely as necessary the specific engine torque limits established by the illustrated curves. It is to be noted that the required number of closed clearance pockets decreases generally as the torque curves are crossed in the direction of increasing discharge pressure. In the left-hand portion of the graph, a similar reduction in closed pockets occurs as the suction pressure initially increases. However, as the suction pressure continues to increase, with the discharge pressure held within relatively narrow limits, the number of closed pockets remains fixed and then reverses so that the number of closed pockets required to maintain the torque limits again increases as the suction pressure reading increases. Since the sub-areas are rectanglar in shape, the pocket closed areas only approximate the torque curves. It is obvious, however, that the more selected pressure levels used, that is, the more control points that may be read, the closer the approximation to the torque curves. Further reference will be made to this graph from time to time as the description progresses. It is believed that the preceding description is sufficient for those skilled in the use of reciprocating compressors to understand the basis of the system of my invention.

Referring now to FIGS. 1A and 1B, there is illustrated the automatic torque control circuits for the particular engine-compressor unit illustrated in the left of FIG. 1A, this circuit arrangement embodying one form of my invention. Within the circuit arrangement, certain conventional symbols have been used in order to simplify the illustration. For example, relays having slow release characteristics are designated by downward-pointing arrows drawn through the movable portion of the relay contacts. Such conventional symbols indicate that the relay holds its front contacts closed, and thus back contacts open, for a preselected time interval after deenergization. Other relays are provided with continuity transfer contacts which, when the relay is energized, close the front contact prior to the interruption of the circuit over the corresponding back contact of the transfer arrangement. Such contact sets are marked by a conventional symbol comprising a short arc at the end of the movable portion or armature of the transfer contact symbol. The apparatus of my invention is also provided with a local source of direct current energy. This source may be any type well known in the art, such as a battery or a rectifier. Since such power sources are well known and their use is conventional, the particular source here used has not been specifically illustrated, only the positive and negative terminals thereof being indicated by the conventional reference characters B and N, respectively.

In the lower left of FIG. 1B are illustrated four compressor pocket actuating relays CPA1, CPA2, CPA3 and CPA4. One pocket actuating relay is assigned to control each clearance pocket CP of the associated compressor RC, shown in FIG. 1A, which will be described in more detail later. The compressor pocket actuating relays are further connected in a reversible counting chain arrangement. The actual chain connections and its operation are similar to that disclosed in the copending application for Letters Patent of the United States, Serial No. 685,655, filed September 23, 1957 by A. P. Jackel, for a Driver Circuit for Reversible Counting Chains, now Patent No. 2,954,511, issued September 27, 1960, this patent and the present application having the same assignee. No claim is made in the present case for any of the details of the reversible counting chain and it is described herein only sufficiently for an understanding of its operation as required by the arrangement of the present invention. Reference is made to the prior Jackel patent for such full details as may be desired. The counting chain network also includes contacts of detection relays ADD and SUB, which control the adding and subtracting of counts, that is, pockets closed, to the chain condition, and contacts of the even-odd selection relay EOS which differentiates between the even and odd counts entered into the chain. Controlling the supply of energy to the counting network is front contact $b$ of sequence repeater relay SQP which, when in an energized condition, indicates a need for pocket control. In other words, relay SQP repeats the start-up sequence and continued operation of the engine-compressor apparatus to indicate a requirement for checking the number of pockets actually closed against the number of closed pockets required by operating conditions. Relay SQP can best perform this task by directly repeating the operation of engine CE. Thus a control linkage, of a type in accordance with the type of engine used and here shown conventionally by the dotted line 10 connecting engine CE and relay SQP, is provided to cause the energization of relay SQP at any time that engine CE is operating.

Assuming relay SQP energized, so that its front contact

*b* is closed, and all of the actuating relays released, that is, a zero count in the chain, I shall now describe the operation of the reversible counting chain. It is to be noted that, since relay SQP remains up during operating conditions, wire 11 which extends from front contact *b* of this relay to the counting chain network effectively becomes the same as terminal B of the local source and will be considered as the positive power bus for the chain in the description. It is further assumed that relay ADD is now energized and picks up to actuate the entry of a count into the chain. Relay CPA1 is then energized by a circuit traced from wire 11 over back contact *b* of relay EOS, back contact *b* of relay SUB, front contact *b* of relay ADD, back contact *c* of relay EOS, back contacts *b* of relays CPA4 and CPA2, and the winding of relay CPA1 to terminal N. The circuits and manner for energizing relays ADD and SUB to detect the necessity for the entry or subtraction of counts, respectively, from the chain will be discussed later in the description. When relay CPA1, thus energized, picks up, the closing of its front contact *a* completes an initial stick circuit including that front contact and the relay winding, back contact *c* of relay CPA2, back contact *a* of relay EOS, and front contact *c* of relay ADD. At this time, both terminals of the upper winding of relay EOS are connected to wire 11, and thus to terminal B of the source, so that relay EOS remains released.

Relay ADD shortly releases, in a manner to be described later, and the opening of its front contact *c* removes the connection to wire 11 from the right-hand terminal of relay EOS. This latter relay is now energized by the circuit extending from wire 11 over back contact *b* and the upper winding of relay EOS, back contact *c* of relay CPA2, and front contact *a* and the winding of relay CPA1 to terminal N. This circuit energizes relay EOS, which then picks up, and retains energized relay CPA1. When relay EOS picks up, its continuity transfer contact *b* transfers the energizing circuit without interruption from back contact *b* to front contact *b*, the new circuit further including back contact *b* of relay SUB in preparation for the possibility of a subsequent deletion of a count. This action completes a stick circuit for relay EOS which retains the relay energized and in addition maintains the stick circuit for relay CPA1. Relay EOS is thus energized and picks up at the end of the entry of any odd numbered count into the counting chain, that is, when the resulting total count in the chain is an odd number. Relay EOS, as will appear shortly, is deenergized and releases at the end of any counting action when an even number of the actuating relays CPA remain energized in the counting chain. Relay EOS prepares the circuits, as it picks up or releases, for the entry or subtraction of the next count from the chain.

I shall now assume that relay ADD again picks up, closing its front contacts. This completes the circuit for energizing relay CPA2 which extends from wire 11 over front contact *b* of relay EOS, front contact *b* of relay ADD, front contact *c* of relay EOS, back contact *b* of relay CPA3 and front contact *b* of relay CPA1 to the winding of relay CPA2. Relay CPA2 picks up, closing its own front contact *a* to complete an initial stick circuit which further includes back contact *c* of relay CPA3 and front contact *b* of relay EOS. The transfer of contact *c* of relay CPA2 from its back to its front position completes a final stick circuit for relay CPA1 which includes front contact *c* of relay CPA2 and front contact *a* and the winding of relay CPA1. The transfer to this final stick circuit is accomplished without interruption of the energization of the winding of relay CPA1 due to transfer contact *c* of relay CPA2 being of the continuity type. The closing of front contact *c* of relay ADD during this action completes a second stick circuit for relay EOS which further includes front contact *a* and the lower winding of this latter relay. This assures that relay EOS is held energized when back contact *c* of relay CPA2 opens in the original stick circuit for relay EOS. Relay ADD eventually releases to complete the counting action and the opening of its front contact *c* interrupts the last described stick circuit for relay EOS which is thus deenergized and shortly releases. The existing stick circuit for relay CPA2 is then transferred by contact *b* of relay EOS to include back contact *b* of relay EOS and back contact *b* of relay SUB. The continuity action of transfer contact *b* of relay EOS assures that relay CPA2 remains energized during this action.

If relay ADD picks up again, relay CPA3 is energized in a manner quite similar to that described for relay CPA1 during the first count with the exception that the circuit is completed to the winding of relay CPA3 over front contact *b* of relay CPA2. The initial stick circuit for relay CPA3 includes its own front contact *a*, back contact *c* of relay CPA4, back contact *a* of relay EOS and front contact *c* of relay ADD. The stick circuit for relay CPA2 if transferred to the direct connection to bus wire 11 over front contact *c* of relay CPA3, this action occurring, because of the continuity transfer of contact *c* of relay CPA3, without interruption of the energization of the winding of relay CPA2. Again relay EOS is held released by the application of positive energy to both terminals of the upper winding until relay ADD releases to terminate the counting action. Relay EOS is then energized by a circuit which includes its own back contact *b* and upper winding, back contact *c* of relay CPA4, and front contact *a* of relay CPA3. Relay EOS then picks up, completing a joint stick circuit for itself and relay CPA3 which includes front contact *b* of relay EOS and back contact *b* of relay SUB.

It is now assumed that next action requires the subtraction of a count from the existing total in the counting chain so that relay SUB is picked up in a manner which will be described hereinafter. The closing of front contact *c* of relay SUB completes another stick circuit for relay EOS which also includes back contact *c* of relay ADD and front contact *a* and the lower winding of relay EOS. The stick circuit for the upper winding of relay EOS and also relay CPA3 is interrupted at back contact *b* of relay SUB so that relay CPA3 releases to subtract a count from the existing total. This transfers the stick circuit connection to wire 11 for relay CPA2 from front contact *c* of relay CPA3 to back contact *c* of relay CPA3 and front contact *b* of relay EOS. When relay SUB releases at the end of the action, the opening of its front contact *c* deenergizes relay EOS which releases. However, the stick circuit for relay CPA2 is transferred to include back contacts *b* of relays SUB and EOS, this action, because of continuity type transfer contact *b* of relay EOS, occurring without interruption of the energization of relay CPA2.

It is further assumed that relay SUB again picks up. Relay CPA2 is then deenergized, by interruption of its stick circuit at back contact *b* of relay SUB, and releases to subtract another count from the total. The stick circuit for relay CPA1 is transferred from front contact *c* of relay CPA2 to the connection to wire 11 including back contact *c* of relay CPA2, back contact *a* of relay EOS, front contact *c* of relay SUB, and back contact *c* of relay ADD. Relay EOS is initially held released by the application of energy from terminal B to both terminals of its upper winding. When relay SUB releases and opens its front contact *c*, the stick circuit of relay CPA1 is transferred to include back contact *b* and the upper winding of relay EOS. This circuit also energizes relay EOS which picks up, completing a stick circuit for itself and for relay CPA1 which extends from wire 11 over front contact *b* of relay EOS, back contact *b* of relay SUB, the upper winding of relay EOS, back contact *c* of relay CPA2, and front contact *a* and the winding of relay CPA1. With relay EOS energized and picked up, the counting chain network is prepared either for the subsequent addition or subtraction of a count to the existing total. However, it is believed that the preceding description adequately explains the operation of the reversible counting chain which is comprised of the compressor pocket actuating relays CPA1 to CPA4 inclusive.

The description now shifts to the compressor, the engine, and the pressure measurement devices shown at the left of FIG. 1A. All of this apparatus is shown conventionally in a schematic manner for the sake of simplicity in the present drawings, since such apparatus is well known in the art and various types may be used. The compressor engine CE, for example, may be a natural gas engine which is supplied with its operating fuel from the pipeline for which the compressor station provides control. A reciprocating compressor RC is shown as having intake and discharge valves with the proper pipe connections from the pipe line. Compressor RC is also illustrated as having four clearance pockets, referenced CP1 to CP4, inclusive. As shown schematically, each pocket has a piston which may be positioned to close off the pocket space from the main cylinder space of the compressor or to open the clearance pocket to add to the volume in the compressor cylinder to thus reduce engine torque. The pocket pistons are controlled by solenoids CP1S to CP4S, inclusive. In the present specific illustration, the energization of the solenoid causes the piston of the corresponding clearance pocket to be pulled to the right to open the pocket to add to the volume of the compressor cylinder. When the solenoid is deenergized, the corresponding piston returns to its closed position by spring action. Each solenoid is energized by a simple circuit including back contact $e$ of the correspondingly numbered pocket actuating relay. For example, the circuit for solenoid CP1S includes back contact $e$ of relay CPA1 and wire 21. Thus when a particular CPA relay is energized, the associated compressor pocket is closed. However, in order to allow a clearer illustration of the arrangement, each piston is shown in its "pocket-closed" position, although the corresponding solenoids are energized in the at-rest condition illustrated in FIGS. 1A and 1B. It is obvious that other arrangements and types of pocket control may be used with proper modification of the circuits to allow for the particular type of control required. Such modifications are well known to those skilled in the art and need not be described in more detail. It is sufficient to here assume the type of operation shown for the purpose of providing an understanding of the novel circuitry of my invention.

The intake and discharge pipes connected to the compressor cylinder each have connected thereto a pressure measurement device which is illustrated as being of the Bourdon tube type with pressure selective switches. For example, the discharge pressure detection switch DPD is provided with four pressure selective contacts $a$, $b$, $c$, and $d$. Each contact closes the circuit to the fixed contact of the device at a selected discharge pressure. In a specific example, here illustrated, these pressures are those designated in the graph of FIG. 2 by the horizontal lines designated as discharge pressures of 690, 720, 745, and 770 pounds per square inch (p.s.i.). Contacts $a$, $b$, $c$ and $d$ of device DPD correspond to these discharge pressures in the ascending direction, respectively. Similarly, suction pressure detection device SPD is provided with eight contacts, corresponding in ascending order to the suction pressures indicated by the vertical lines in the graph of FIG. 2, beginning with pressure selective contact $a$ which corresponds to the lowest pressure of 280 pounds per square inch. Said in another way, contact $a$ of device SPD closes to the fixed contact of this device when the suction pressure reaches or exceeds 280 p.s.i. while contact $h$ of device SPD is not closed to the fixed contact until the suction pressure equals or exceeds 570 p.s.i. In each of these pressure detection devices, each selective contact remains closed at all higher pressures so that, at the highest pressure, all contacts are closed to the fixed contact and thus are connected to terminal B of the local source.

Each pressure detection device has associated therewith a series of pressure registry relays also shown in FIG. 1A, there being one relay for each contact of each device. The reference character associated with each pressure registry relay indicates by the letter portion thereof whether the relay is associated with suction pressure SP or discharge pressure DP. The numerical portion of each reference character indicates the actual pressure (p.s.i.) which the relay indicates when energized. Each relay is energized by an obvious circuit extending between terminals B and N of the local source and including the relay winding and the contact of the associated detection device which closes at the corresponding pressure. Thus relay SP320 is energized when contact $b$ of pressure detection device SPD is closed, thus indicating that the measured suction pressure is equal to or exceeds 320 p.s.i. Circuits for the remaining pressure registry relays are believed to be easily understood by reference to the drawings. However, it is evident that, for each pressure detection switch, all registry relays corresponding to selected pressure levels lower than the actual existing pressure level are simultaneously energized.

The pressures measured by the registry relays of FIG. 1A are translated into a compressor pocket closed requirement by energizing one of the compressor pocket closed relays CPC shown at the lower right of FIG. 1B. The numerical prefix in each reference character for these latter relays indicates the number of compressor pockets which must be closed under the conditions indicated by the energized relay. There is a compressor pocket closed relay for each required condition or combination of the closed compressor pockets including that condition when no or zero pockets are closed, that is, all the pockets are open. There are thus five relays CPC in the illustrated arrangement. These relays are energized one at a time through the contact matrix comprising contacts of the pressure registry relays. This contact matrix forms a computing network which approximates the position which the two measured pressures establish in the typical torque limiting curves of FIG. 2. This computing network includes a front contact $c$ of sequence repeater relay SQP, previously described, so that the network is active to energize a relay CPC only when the engine is operating. An additional initial selection is made if an engine shut-down action has been initiated which causes the energization of shut-down actuating relay SDA shown in the upper portion of FIG. 1A. If the shut-down of engine CE has been initiated, relay SDA selects the zero pocket relay 0CPC over its front contact $a$ and wire 12 without regard to the existing pressures which are measured during the intermediate conditions as the engine is shutting down.

With engine CE operating so that front contact $c$ of relay SQP is closed, and with relay SDA released, i.e., no engine shut-down initiated, energy is supplied from terminal B into the contact matrix to energize the proper relay CPC in accordance with the measured pressures. Referring to FIG. 2, it is obvious from the graph that, if the suction pressure is less than 280 p.s.i. or greater than 570 p.s.i., or if the discharge pressure is less than 690 p.s.i., all four of the compressor clearance pockets must be closed. This is accomplished in the contact matrix by direct connection of back contact $a$ of relay SP280, front contact $a$ of relay SP570, and back contact $a$ of relay DP690 to wire 16 which in turn is connected to the winding of relay 4CPC. More specifically, when relay SP280 is deenergized so that its back contact $a$ is closed, the connection is made to energize relay 4CPC regardless of which discharge pressure relay DP is energized. Similarly, if all of the suction pressure relays SP are energized, the connection extends from the back contact $a$ of relay SDA over front contact $a$ of relay SP280 and front contact $a$ of relay SP570 to wire 16 to energize relay 4CPC. Likewise, if none of the discharge pressure relays DP are energized so that back contact *a* of relay DP690 is closed, the circuit is completed over front contact *a* of relay SP280, back contact *a* of relay SP570, and back contact *a* of relay DP690 to wire 16. Also to agree with the graph of FIG. 2, another connection to wire 16 is completed over front contact *a* of relay SP280, back contact *a* of relay SP570, front contact *a* of relay DP690 back contact *a* of relay DP720, and back contact *d* of relay SP320. This meets the requirement that all four pockets must be closed if the suction pressure is less than 320 p.s.i. while the discharge pressure is between 690 and 720 p.s.i. Three other connections to wire 16 are provided over front contact *c* of relay SP480, front contact *c* of relay SP510, and front contact *b* of relay SP540 to meet the requirements for all pockets closed if the suction pressure is greater than 480 p.s.i. while the discharge pressure is less than 720 p.s.i., the suction pressure greater than 510 p.s.i. while the discharge pressure is less than 745 p.s.i., and when the suction pressure is greater than 540 p.s.i. with the discharge pressure less than 770 p.s.i. The remaining portions of these latter three circuits may be traced as desired by reference to the drawings and the requirements of the chart of FIG. 2.

Other specific illustrations will help in a complete understanding of the computer matrix which controls the compressor pocket closed relays. For example, if the suction pressure is greater than 280 p.s.i. but less than 320 p.s.i. while the discharge pressure is greater than 720 p.s.i., the requirement illustrated in the graph of FIG. 2 is for three pockets to be closed, that is, for relay 3CPC to be energized. Under these conditions, the circuit includes front contact *a* of relay SP280, back contact *a* of relay SP570, front contacts *a* of relays DP690 and DP720; then one of the three parallel circuits including back contact *a* of relay DP745 and back contact *c* of relay SP320; front contact *a* of relay DP745, back contact *a* of relay DP770, and back contact *b* of relay SP320; or front contacts *a* of relays DP745 and DP770 and back contact *a* of relay SP320; thence back contact *c* of relay SP480 and wire 15 to the winding of relay 3CPC. Other conditions which also require the energization of relay 3CPC are shown in FIG. 2. The matrix circuits for these conditions may be traced as desired, with reference to FIG. 2 and the preceding description, each circuit concluding over wire 15 to the winding of relay 3CPC.

A circuit for energizing relay 2CPC is completed, for example, if the discharge pressure is greater than 720 p.s.i. but less than 745 p.s.i., while the suction pressure is in the range between 320 p.s.i. and 480 p.s.i. This circuit includes front contact *a* of relay SP280, back contact *a* of relay SP570, front contacts *a* of relays DP690 and DP720, back contact *a* of relay DP745, front contact *c* of relay SP320, back contact *b* of relay SP480, and wire 14 to the winding of 2CPC. If the suction pressure then increases to exceed 480 p.s.i., the closing of front contact *b* of relay SP480 provides a connection, also including back contact *c* of relay SP510 to wire 15 to energize relay 3CPC. If the suction pressure continues to increase beyond 510 p.s.i., the closing of front contact *c* of relay SP510 transfers the connection to wire 16 to energize relay 4CPC.

If the discharge pressure is between 745 and 770 p.s.i. while the suction pressure is greater than 360 p.s.i. but less than 480 p.s.i., a circuit is established for relay 1CPC which includes front contact *a* of relay SP280, back contact *a* of relay SP570, front contacts *a* of relays DP690, DP720, and DP745, back contact *a* of relay DP770, front contacts *b* of relays SP320 and SP360, back contact *a* of relay SP480, and wire 13 to the winding of relay 1CPC. If the discharge pressure now increases beyond 770 p.s.i., there will be no change in the energized relay unless the suction pressure is actually in the range between 400 p.si. and 480 p.s.i. Under this latter condition, the circuit just traced will be interrupted from relay 1CPC and extends from front contact *a* of relay DP770 over front contacts *a* of relays SP320, SP360, and SP400 and back contact *a* of relay SP510 to wire 12 and thus to the winding of relay 0CPC. Various other combinations of pressure conditions may exist which will complete circuits other than ones already traced for the energization of the various relays CPC. It is believed that the circuits existing under these other conditions may now be traced if desired, by reference to the preceding description taken in connection with the drawings, without detailed description herein.

Relays ADD and SUB are controlled by a circuit network including contacts of the relays CPC and CPA in order to detect any change in the pocket condition requirement and more particularly a disagreement between the existing combination of the pockets closed and the requirement for closed clearance pockets. A back contact *a* of timing relay ASTM is inserted in this network to space the operation of the compressor pockets so that only one such operation can occur during the selected time interval established during the release time of relay ASTM. With engine CE operating so that relay SQP is energized, relay ASTM is initially energized by a circuit traced from terminal B over front contact *a* of relay SQP, back contact *a* of governor control actuator relay GCA, wire 17, and the winding of relay ASTM to terminal N. Governor control actuator relay GCA is energized by the circuit including front contact *a* of start sequence relay STSQ, contact 25, and the winding of relay GCA. Contact 25 is controlled by the engine-compressor and associated apparatus, in any well known manner, to close during operation, only when compressor RC is loaded. This occurs when the compressor is placed "on-line", i.e., the suction and discharge connections to the pipe line are opened. Such action is taken after engine CE has been started by the energization of relay STSQ (relay SQP also picks up at this time) and allowed to reach operating conditions. Relay STSQ remains energized after the initiation of engine operation until a shut-down is actuated, as will be explained shortly. Thus relay GCA, once energized, holds energized as long as engine CE remains operating. Relay ASTM has two supplemental energizing circuits, one including front contact *d* of relay ADD and the other including front contact *d* of relay SUB. These latter circuits function during counting action, as will be shortly described, when a requirement for additional or fewer compressor pockets closed is being entered into the counting chain. The release time of relay ASTM is set to span the necessary time for engine CE to initially come up to its operating speed or to assume a new speed or torque condition during regular operation. As one specific example, this release time may be set for 60 seconds. It is to be noted that relay ASTM is initially deenergized when relay GCA picks up during engine start-up operation.

Depending upon the already energized CPA relays, the energization of a different relay CPC to indicate a different requirement for closed pockets causes the energization of either relay ADD or relay SUB. However, the specific circuit is completed only when relay ASTM releases to close its back contact *a*. In addition, the energized condition of the relays CPA must agree with the position of relay EOS, contacts of which are also inserted in the network for relays ADD and SUB. During the initial start-up of engine CE, with all CPA relays released, a circuit is completed for relay ADD upon the closing of back contact *a* of relay ASTM which further includes front contacts *a* of relays SQP and GCA, wire 18, and back contacts *d* of relays CPA1, 0CPC, and EOS.

With relay CPA1 energized, and relay EOS also energized in agreement with the odd count in the counting chain, a circuit extends over front contact *d* of relay CPA1, back contact *d* of relay CPA2, front contacts *c*, in multiple, of relays 2CPC, 3CPC, and 4CPC, and front contact d of relay EOS to the winding of relay ADD. A branch path over front contact c of relay 0CPC and front contact e of relay EOS causes the energization of relay SUB if the next count is to be subtracted from the counting chain. It is to be noted that front contacts a of relays ADD and SUB by-pass back contact a of relay ASTM in the circuit network to provide a stick arrangement for holding the detection relays ADD and SUB energized when relay ASTM picks up, energized either over front contact d of relay ADD or relay SUB, as previously discussed. From an observation of the circuit in the drawings, it is obvious that the circuits for relays ADD and SUB over front contact d of relay CPA2 all check that relay EOS is released and further include a back contact d of relay CPA3. Similarly, the circuits over front contact d of relay CPA3 check a back contact of relay CPA4 and a front contact of relay EOS. With relay CPA4 energized and picked up, no further addition can be entered into the counting chain, obviously since only four compressor pockets are provided, and thus the circuit over front contact d of relay CPA4 can only energize relay SUB over back contact e of relay EOS if requirement for four compressor pockets closed no longer exists, as would be indicated by the closing of back contact d of relay 4CPC.

Only one other relay has not been fully described, the starting sequence relay STSQ. The circuit for this relay is only partially shown as it is controlled by relays involved in the arrangement of my invention. It is otherwise sufficient to understand that this relay is energized and picks up to initiate the start-up action of engine CE and holds as long as engine CE is to continue to run. Further description of this operation will be included as part of the operational description of this system which follows shortly. In describing the operation of this system, I shall assume that the apparatus initially is in its nonoperating condition, having been shut down sometime previously. All the relays are thus released which is the condition in which they are shown in the drawing.

The operation of engine CE is initiated when desired by the energization, in any well known manner, of relay STSQ, providing that relay SDA is released to close its back contact b, as would normally be the condition after shutdown has been completed previously. This is immediately followed by the energization of relay SQP as engine CE starts up. This latter relay will remain energized as long as engine CE is operating, to provide an indication of the need to continuously check the number of closed pockets required. The closing of front contact a of relay SQP, with back contact a of relay GCA closed, energizes timing relay ASTM in a manner previously described. Relay GCA is then energized as a result of the loading of compressor RC at the end of the start-up sequence for engine CE and, once energized, will remain in this condition as long as the engine is running. Front contact a of relay GCA closes to prepare detection circuits for relays ADD and SUB. When back contact a of relay GCA opens, it interrupts the circuit for relay ASTM which, although deenergized, retains its back contact a open for a preselected time interval.

As previously indicated, the time release interval of relay ASTM is preselected to provide sufficient time for engine CE to come up to its initial selected speed prior to the closing of back contact a of relay ASTM. As the engine operates the reciprocating compressor, a requirement is established for closing a selected number of compressor clearance pockets. I shall assume for purposes of the present description that as the engine comes up to speed, a requirement is established for the closing of two compressor pockets. Said in another way, it is assumed that the discharge pressure rises to a level between 720 and 745 p.s.i. while the existing suction pressure is greater than 320 p.s.i. but less than 480 p.s.i. By reference to FIG. 2, it is obvious that a requirement then exists for two compressor pockets to be closed. Under these conditions, a circuit for relay 2CPC extends from terminal B over front contact c of relay SQP, back contact a of relay SDA, front contact a of relay SP280, back contact a of relay SP570, front contacts a of relays DP690 and DP720, back contact a of relay DP745, front contact c of relay SP320, back contact b of relay SP480, wire 14, and the winding of relay 2CPC to terminal N.

The eventual release of relay ASTM closes its back contact a in the circuit network for detection relays ADD and SUB. With no relays CPA presently energized, and with relay 0CPC now released, the previously traced circuit is completed for energizing relay ADD, the circuit including back contacts d of relays CPA1, EOS, and 0CPC. Relay ADD picks up, closing its own front contact a to provide a stick circuit by-passing back contact a of relay ASTM. This latter relay is reenergized by the closing of front contact d of relay ADD and picks up. With front contact b of relay SQP closed, the picking up of relay ADD completes the circuit for energizing relay CPA1, as was previously traced. When relay CPA1 picks up and opens its back contact d, the stick circuit existing for relay ADD is interrupted and this latter relay eventually releases at the end of a slow release period. Relay ADD is deenergized at this time because the circuits over back contact d of relay CPA2, which is now connected over front contact d of relay CPA1, are presently interrupted as they include front contacts of relay EOS which has not yet been energized. The release of relay ADD, however, results in the energization of relay EOS as previously described, and this relay picks up, providing a stick circuit for itself and for relay CPA1. When relay CPA1 picks up, the opening of its back contact e deenergizes solenoid CP1S to release the piston of pocket CP1, thus closing that pocket.

The release of relay ADD interrupts, at its front contact a, the detection circuit network and at its front contact d deenergizes relay ASTM which again initiates its slow release period. Under the existing conditions, the eventual release of relay ASTM to close its back contact a reenergizes relay ADD. The circuit at this time includes front contact d of relay CPA1, back contact d of relay CPA2, front contact c of relay 2CPC, and front contact d of relay EOS. With relay ADD thus picking up to again close its front contacts, relay CPA2 of the counting chain is energized and the chain network registers the second count in the manner previously described. The opening of back contact e of relay CPA2 deenergizes solenoid CP2S to close pocket CP2. Since relay EOS is held energized during the entry of this second count into the chain, the circuit over front contact d of relay CPA2 and back contact d of relay CPA3 is interrupted at back contacts d and e of relay EOS so that neither relay ADD nor relay SUB can be energized at this time. Since the circuit over back contact d of relay CPA2 is interrupted, relay ADD releases and once again deenergizes relay ASTM. However, when relay ASTM eventually releases, the closing of its back contact a does not complete any circuit for relay ADD or SUB since no front contact of relay 2CPC is included in the specific network connected over back contact d of relay CPA3.

The system now holds steady in the existing condition if discharge and suction pressures remain with the previously described limits. If the discharge pressure decreases below 720 p.s.i., the compressor pocket computing network readjusts to energize relay 3CPC, a requirement indicated on the graph of FIG. 2. This shift includes back contact a of relay DP720, front contact d of relay SP320, back contact c of relay SP480 and wire 15 in the active circuit. Referring to the detection circuit network of FIG. 1B, it is obvious that the closing of front contact b of relay 3CPC at this time completes a circuit for energizing relay ADD. This results in entering a third count into the counting chain so that relay CPA3 becomes energized followed, after release of relay ADD, by the energization and pick up of relay EOS.

The pick up of relay CPA3 releases solenoid CP3S to close pocket CP3. The system now holds with three pockets closed, there being no circuit over front contact *d* of relay CPA3 and back contact *d* of relay CPA4 for energizing either of the detection relays. Based on the originally assumed pressure conditions, a similar action will occur if the suction pressure increases beyond 480 p.s.i. with the exception that the computer circuit completed for relay 3CPC differs slightly in composition.

If, instead of the previously mentioned changes in pressure, the suction pressure changes to the range between 360 and 480 p.s.i., and the discharge pressure increases to between 745 and 770 p.s.i., the computer circuit network shifts to cause the energization of relay 1CPC, a requirement that is indicated by the graph of FIG. 2. The circuit includes front contacts *a* of relays DP690, DP720, and DP745, back contact *a* of relay DP770, front contacts *b* of relays SP320 and SP360, back contact *a* of relay SP480, and wire 13. With relay ASTM released, and relays CPA1 and CPA2 picked up, a circuit is completed, further including back contact *d* of relay CPA3, front contact *b* of relay 1CPC and back contact *e* of relay EOS, for energizing relay SUB which, thus energized, picks up. The closing of front contact *a* of relay SUB provides a stick circuit for this relay, by-passing back contact *a* of relay ASTM which opens when this latter relay is energized by the closing of front contact *d* of relay SUB. The pick up of relay SUB, in a manner previously described, results in the deenergization of relay CPA2 to remove a count from the counting chain but relay CPA1 remains energized although its stick circuit is shifted. The closing of back contact *e* of relay CPA2 causes the opening of compressor pocket CP2 through the energization of solenoid CP2S. Upon the release of relay SUB, relay EOS picks up to reflect an odd number of CPA relays energized. The release of relay CPA2 to open its front contact *d* interrupts the stick circuit for relay SUB which releases. However, when relay ASTM eventually releases, no circuit exists for energizing either relay ADD or SUB and no further action occurs in this network at this time. The system then holds with one compressor pocket closed, controlled by the open back contact *e* of relay CPA1.

It was previously noted that relay ASTM functions to space the operation of the compressor pockets. If, for example, relay SDA is now actuated to initiate an engine shut-down sequence, relay 0CPC is immediately energized over front contact *a* of relay SDA. Assuming that two compressor pockets are closed at this time, a circuit for energizing relay SUB exists including back contact *d* of relay CPA3, front contact *b* of relay 0CPC, and back contact *e* of relay EOS. The pick up of relay SUB results in the subtraction of a count from the counting chain, relay CPA2 releasing to open pocket CP2. When relay CPA2 releases, relay SUB is deenergized since circuits over back contact *d* of relay CPA2 include front contacts of relay EOS which presently is released. Although relay EOS is shortly energized and picks up in the action of the counting chain, no circuit for relay SUB is immediately completed since back contact *a* of relay ASTM is open to interrupt the detection circuit network. When relay ASTM eventually releases, at the end of its selected time period, relay SUB is reenergized over back contact *d* of relay CPA2, front contact *c* of relay 0CPC, and front contact *e* of relay EOS. This results in the subtraction of still another count from the counting chain so that relay CPA1 releases to cause the opening of pocket CP1. With relay SDA picked up to open its back contact *b*, the release of relay CPA1 to open its front contact *f* causes the release of relay STSQ in an obvious manner. Release of this latter relay shuts down engine CE and the system becomes inactive. It should be noted, however, that the action of relay ASTM during this procedure of shut-down causes a gradual shut-down operation with an individual opening of the various compressor pockets rather than an immediate opening of all pockets simultaneously.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In combination with a reciprocating compressor operating between varying values of suction pressure and discharge pressure and having at least one selected load pressure operating curve, adjustable torque limiting means for maintaining the compressor load substantially on said selected operating curve, a first series of register relays having connections to said compressor for registering sequentially selected suction pressure levels, a second series of register relays having connections to said compressor for registering sequentially selected discharge pressure levels, a computing circuit network comprising a matrix of contacts of said first and second register relay series approximating said compressor operating curve and a torque relay for each position of said torque limiting means, said network being responsive to the registered pressures for energizing a selected torque relay to determine the required position of said torque limiting means for maintaining the compressor load substantially on said operating curve, and means controlled by said torque relays and having connections for adjusting the position of said torque limiting means in accordance with the required position determined by said computing circuit network.

2. In combination with a reciprocating compressor unit having clearance pockets controllable to open and closed positions for varying cylinder volume to limit the torque requirements of said unit, a means for registering the suction and discharge pressures of said compressor, a computing means controlled by said registering means for establishing the required number of pockets to be closed in accordance with the existing registered pressure conditions, detection means controlled by said computing means and responsive to the existing closed pocket combination for detecting disagreement between the existing and the required number of closed pockets, said detection means having connections for controlling the pockets to obtain agreement between the existing closed pocket combination and the required closed pocket combination.

3. In combination with a reciprocating compressor having a plurality of clearance pockets controllable to open and closed positions for varying cylinder volume to limit the torque requirements of said compressor, a first and a second plurality of relays for registering the suction and the discharge pressures respectively of said compressor, a circuit network comprising a contact matrix of the pressure registry relays arranged to compute the required number of closed pockets in accordance with a predetermined relationship of said suction and discharge pressures, a pair of detection relays and an energizing network therefor including contacts controlled by said circuit network and other contacts which indicate the existing number of closed pockets, said energizing network energizing one of said detection relays in accordance with any disagreement detected between the existing and the required number of closed pockets, and pocket control means having control connections to said pockets and responsive to the energization of either one of said detection relays for changing the number of pockets closed into agreement with the required number of closed pockets computed by said circuit network.

4. In combination with a reciprocating compressor having a plurality of clearance pockets controllable to open and closed positions for varying cylinder volume to limit the torque requirements of said compressor, a first and a second plurality of relays for registering the suction and the discharge pressures respectively of said compressor, a series of pocket relays one for each possible different number of closed pockets, a circuit network including a matrix of contacts of the pressure registry relays for energizing a selected one of said pocket relays in accordance with a predetermined relationship between said suction and discharge pressures to establish the required number of closed pockets for the existing pressure conditions, a pair of detection relays and an energizing network therefor including contacts of said pocket relays and other contacts controlled to indicate the existing number of closed pockets, said energizing network energizing one of said detection relays when a disagreement is detected between the required and the existing number of closed pockets, and pocket control means having control connections to said pockets and responsive to the energization of either one of said detection relays for changing the number of pockets closed into agreement with the required number of closed pockets computed by said circuit network.

5. In combination with a reciprocating compressor having a plurality of clearance pockets controllable to open and closed positions for varying cylinder volume to limit the torque requirements of said compressor, a first and a second plurality of relays for registering the suction and the discharge pressures respectively of said compressor, a series of pocket relays one for each possible different number of closed pockets, a circuit network including a matrix of contacts of the pressure registry relays for energizing a selected one of said pocket relays in accordance with a predetermined relationship between said suction and discharge pressures to establish the required number of closed pockets for the existing pressure conditions, a reversible relay counting chain having one relay for each compressor pocket, each counting chain relay when energized during the counting operation of said chain controlling the corresponding pocket to its closed position, a pair of detection relays and an energizing network therefor including contacts of said pocket relays and contacts of said counting chain relays for energizing one of said detection relays when said energizing network detects a disagreement between the existing number and the required number of closed pockets, said detection relays having connections to said counting chain for entering and deleting counts to obtain agreement between the existing and the required number of closed pockets.

6. In combination with a reciprocating compressor having a plurality of clearance pockets controllable to open and closed positions for varying cylinder volume to limit the torque requirements of said compressor, a first and a second plurality of relays for registering the suction and the discharge pressures respectively of said compressor, a series of pocket relays one for each possible different number of closed pockets, a circuit network including a matrix of contacts of the pressure registry relays for energizing a selected one of said pocket relays in accordance with a predetermined relationship between said suction and discharge pressures to establish the required number of closed pockets for the existing pressure condition, a plurality of actuating relays one for each compressor pocket and each having connections for operating the corresponding pocket between its two positions, a pair of detection relays and an energizing network therefor including contacts of said pocket relays and contacts of said actuating relays for energizing one of said detection relays when said energizing network detects a disagreement between the existing number and the required number of closed pockets, and a reversible counting chain network including said actuating relays and contacts of said detection relays for controlling said actuating relays into agreement with the required number of closed pockets designated by said pocket relays.

7. In combination with a reciprocating compressor having a plurality of clearance pockets controllable to open and closed positions for varying cylinder volume to limit the torque requirements of said compressor, a first and a second plurality of relays for registering the suction and the discharge pressures respectively of said compressor, a computing circuit network comprising a contact matrix of the pressure registry relays arranged to compute the required number of closed pockets in accordance with a predetermined relationship of said suction and discharge pressures, a plurality of actuating relays one for each compressor pocket and each having connections for operating the corresponding pocket between its two positions, a pair of detection relays and an energizing network therefor including contacts controlled by said computing circuit network and contacts of said actuating relays for energizing one of said detection relays when said energizing network detects a disagreement between the existing number and the required number of closed pockets, said actuating relays and contacts of said detection relays being connected in a reversible counting chain network for controlling said actuating relays in ascending and descending sequence to close said pockets in the required number computed by said computing circuit network.

8. In combination with a reciprocating compressor having at least one selected load pressure operating curve and provided with a plurality of clearance pockets operable to open and closed positions for adjusting the compressor load substantially to said operating curve, a first and a second plurality of relays for registering the suction and discharge pressures respectively of said compressor, a computing circuit network comprising a contact matrix of the pressure registry relays arranged for computing the required number of closed clearance pockets to maintain the compressor load substantially on said selected operating curve, a pair of detection relays and an energizing circuit network therefor including contacts controlled by said computing network in accordance with closed pocket requirements and other contacts indicating the actual number of closed pockets, said energizing network energizing one of said detection relays in accordance with any disagreement detected between the existing and the required number of closed pockets, and pocket control means having control connections to said pockets and responsive to the energization of either one of said detection relays for changing the number of pockets closed into agreement with the required number of closed pockets computed by said computing circuit network.

9. In combination with a reciprocating compressor having at least one selected load pressure operating curve and provided with a plurality of clearance pockets operable to open and closed positions for adjusting the compressor load substantially to said operating curve, a first and a second plurality of relays for registering the suction and discharge pressures respectively of said compressor, a series of pocket relays one for each possible number of closed pockets, a circuit network including a matrix of contacts of the pressure registry relays having connections for energizing a selected one of said pocket relays corresponding to the required number of closed pockets to maintain the compressor load substantially on said selected operating curve, a plurality of actuating relays one for each compressor pocket and each having connections for operating the corresponding pocket between its two positions, a pair of detection relays and an energizing network therefor including contacts of said pocket relays and contacts of said actuating relays for energizing one of said detection relays when said energizing network detects a disagreement between the existing number and the required number of closed pockets, and a reversible counting chain network including said actuating relays and contacts of said detection relays for controlling said actuating relays into agreement with the required number of closed pockets designated by said pocket relays.

References Cited in the file of this patent

UNITED STATES PATENTS

| | | |
|---|---|---|
| 1,870,956 | McAllister | Aug. 9, 1932 |
| 1,997,476 | Wallene | Apr. 9, 1935 |
| 2,167,369 | Paullin | July 25, 1939 |
| 2,401,910 | Conduit, et al. | June 11, 1946 |
| 2,478,423 | Ponomareff, et al. | Aug. 9, 1949 |
| 2,661,145 | Heineman | Dec. 1, 1953 |